(12) United States Patent
Jeong et al.

(10) Patent No.: US 10,286,784 B2
(45) Date of Patent: May 14, 2019

(54) ELECTRIC TRANSPORTATION SYSTEM

(71) Applicant: Samsung SDI Co., Ltd., Yongin-si, Gyeonggi-do (KR)

(72) Inventors: Hyeon-Cheol Jeong, Yongin-si (KR); Sang-Kyou Kim, Yongin-si (KR); Se-Jin Ji, Yongin-si (KR); Woon-Seong Baek, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 86 days.

(21) Appl. No.: 14/843,163

(22) Filed: Sep. 2, 2015

(65) Prior Publication Data
US 2016/0059704 A1 Mar. 3, 2016

(30) Foreign Application Priority Data
Sep. 3, 2014 (KR) .................. 10-2014-0117047

(51) Int. Cl.
*H02P 3/14* (2006.01)
*B60L 7/12* (2006.01)
(Continued)

(52) U.S. Cl.
CPC .............. *B60L 7/12* (2013.01); *B60L 11/18* (2013.01); *H02P 3/14* (2013.01); *H02P 3/18* (2013.01);
(Continued)

(58) Field of Classification Search
CPC ...... H02P 3/14; B60L 7/10; B60L 7/22; B60L 3/0046; B60L 15/20; B60L 3/0076; B60L 7/20
See application file for complete search history.

(56) References Cited

U.S. PATENT DOCUMENTS 5,332,954 A * 7/1994 Lankin ............... B60L 11/1805
  318/139
2006/0076171 A1 * 4/2006 Donnelly ................ B60L 7/04
  180/65.225
(Continued)

FOREIGN PATENT DOCUMENTS

JP 2006-015887 A 1/2006
KR 10-2011-0033622 A 3/2011

OTHER PUBLICATIONS

Park et al., "A Study on control of regeneration energy in a electrical bicycle system," *Seoul National University*, 2009, pp. 917-918.

*Primary Examiner* — Bickey Dhakal
(74) *Attorney, Agent, or Firm* — Knobbe Martens Olson & Bear LLP

(57) ABSTRACT

An electric transportation system is disclosed. In one aspect, the system includes a wheel, a rechargeable battery having positive and negative poles, and a motor mechanically connected to the wheel and configured to generate a regeneration charge current, the motor including a coil. The system also includes a motor driver connected to the motor and the battery. The motor driver is configured to discharge the battery during a supply period so as to drive the motor and charge the battery with the regeneration charge current, wherein the motor driver includes a plurality of transistors electrically connected to the negative pole during a non-driving period. The system further includes a controller connected to the motor driver and configured to control the motor driver so as to drive the motor during the supply period and control the motor driver so as to charge the battery during the non-driving period.

18 Claims, 3 Drawing Sheets

(51) Int. Cl.
*B60L 11/18* (2006.01)
*H02P 3/18* (2006.01)
(52) U.S. Cl.
CPC .......... *Y02T 10/642* (2013.01); *Y02T 10/7005* (2013.01); *Y02T 10/7258* (2013.01)

(56) References Cited

U.S. PATENT DOCUMENTS

| | | | |
|---|---|---|---|
| 2012/0062176 A1* | 3/2012 | Hasan | B60L 7/14 320/109 |
| 2013/0094269 A1* | 4/2013 | Maeda | H02M 7/003 363/141 |
| 2013/0234629 A1* | 9/2013 | Seol | B60L 11/1805 318/139 |
| 2014/0239870 A1* | 8/2014 | Nawa | H02M 7/53871 318/503 |

* cited by examiner

ELECTRIC TRANSPORTATION SYSTEM

CROSS-REFERENCE TO RELATED APPLICATIONS

This application claims priority to and the benefit of Korean Patent Application No. 10-2014-0117047, filed on Sep. 3, 2014, in the Korean Intellectual Property Office, the entire contents of which are incorporated herein by reference in their entirety.

BACKGROUND

Field

The described technology generally relates to an electric transfer system.

Description of the Related Technology

As environmental pollution and depletion of resources are broadly societal concerns in the developed world, high expectations are being placed on the development of more environmentally friendly and efficient electric transfer systems that use electricity as their power source.

Electric transportation systems, or electric vehicles, such as electric bicycles, electric motorcycles, and electric automobiles and the like include a chargeable/dischargeable battery and an electric motor that receives power from the battery and drives the wheels.

In order to improve the efficiency of the battery, it is charged with energy regenerated from the motor as the wheels are rotate on a downward incline.

SUMMARY OF CERTAIN INVENTIVE ASPECTS

One inventive aspect is an electric transfer system that can improve a battery charging efficiency by improving the amount of regeneration charge current generated during an energy regeneration operation performed during a non-driving period existing between motor driving signals being supplied periodically.

Another aspect is an electric transfer system including a chargeable/dischargeable battery; a motor connected to a wheel; a motor driver connected to the motor and battery, and configured to drive the motor by discharging the battery during a supply period, and to charge the battery using a regeneration charge current generated from the motor during a non-driving period; and a controller connected to the motor driver, and configured to control the motor driver such that the motor is driven during the supply period, and to control the motor driver such that the battery is charged during the non-driving period, wherein the controller controls to store the regeneration charge current in a coil included in the motor by turning on transistors connected to a negative pole of the battery of a plurality of transistors included in the motor driver during the non-driving period, and to charge the regeneration charge current to the battery by turning off the transistors connected to the negative pole.

The controller can repeatedly turn on/off the transistors connected to the negative pole during the non-driving period periodically.

The motor driver can include a plurality of regeneration diodes each connected in parallel to the plurality of transistors.

Pairs of transistors connected in series to each other can be connected in parallel to the battery.

A first electrode of an odd $number^{th}$ transistor of the pairs of transistors are connected to a positive pole of the battery, and a second electrode of an even $number^{th}$ transistor of the pairs of transistors are connected to a negative pole of the battery.

The second electrode of the odd $number^{th}$ transistor of the pairs of transistors can be connected to the first electrode of the even $number^{th}$ transistor of the pairs of transistors.

The motor can include three phase coils connected to the plurality of transistors, and a first terminal of each of the three coils can be connected to one another, and a second terminal of each of the three coils can be connected to a node existing between each pair of transistors.

The plurality of transistors can include a first transistor, second transistor, third transistor, fourth transistor, fifth transistor, and six transistor.

The controller can turn-on control the second, fourth, and sixth transistors during each non-driving period and store a regeneration charge current in the three phase coils, and turn-off control the second, fourth, and sixth transistors and charge the regeneration charge current stored in the three phase coils in the battery.

The regeneration charge current stored in the three coils can be transmitted to the positive pole of the battery through each regeneration coil connected in parallel to the first, third, and fifth transistors.

The electric transfer system can further include a speed sensor connected to the motor and controller, and configured to sense a speed of the motor and supply speed data to the controller, wherein the controller sets the supply period or non-driving period in response to the speed data.

The controller can control a turn-on time of the transistors connected to the negative pole differently during the non-driving period in response to the speed data.

The controller can control the turn-on time to be shorter as the speed data value gets greater.

Another aspect is an electric transportation system comprising a wheel, a rechargeable battery having positive and negative poles, and a motor mechanically connected to the wheel and configured to generate a regeneration charge current, wherein the motor comprises a coil. The system also comprises a motor driver connected to the motor and the battery and configured to i) discharge the battery during a supply period so as to drive the motor and ii) charge the battery with the regeneration charge current, wherein the motor driver includes a plurality of transistors electrically connected to the negative pole during a non-driving period. The system further comprises a controller connected to the motor driver and configured to i) control the motor driver so as to drive the motor during the supply period and ii) control the motor driver so as to charge the battery during the non-driving period, wherein the controller is further configured to i) turn on the transistors during the non-driving period so as to store the regeneration charge current in the coil and ii) turn off the transistors so as to charge the battery with the regeneration charge current.

In the above system, the controller is further configured to periodically turn on and off the transistors during the non-driving period.

In the above system, the motor driver further includes a plurality of regeneration diodes each respectively electrically connected in parallel to the transistors.

In the above system, pairs of the transistors are electrically connected in series to each other and in parallel to the battery.

In the above system, each transistor includes first and second electrodes, wherein the first electrode of an odd number$^{th}$ transistor is electrically connected to the positive pole, and wherein the second electrode of an even number$^{th}$ transistor is connected to the negative pole.

In the above system, the second electrode of the odd number$^{th}$ transistor is electrically connected to the first electrode of the even number$^{th}$ transistor.

In the above system, the coil comprises three phase coils electrically connected to the transistors, wherein a first terminal of each of the three phase coils is electrically connected to one another, and wherein a second terminal of each of the three phase coils is electrically connected to a node between each pair of transistors.

In the above system, the transistors comprise first to sixth transistors.

In the above system, the controller is further configured to i) turn-on the second, fourth, and sixth transistors during each non-driving period, ii) store a regeneration charge current in the three phase coils, iii) turn-off the second, fourth, and sixth transistors, and iv) charge the battery with the regeneration charge current stored in the three phase coils.

In the above system, the regeneration charge current stored in the three coils is configured to be transmitted to the positive pole through a plurality of regeneration coils each respectively electrically connected in parallel to the first, third, and fifth transistors.

The above system further comprises a speed sensor connected to the motor and controller and configured to i) sense a speed of the motor and ii) supply speed data to the controller, wherein the controller is further configured to set the supply period and the non-driving period based at least in part on the speed data.

In the above system, the controller is further configured to change a turn-on time of the transistors electrically connected to the negative pole during the non-driving period based at least in part on the speed data.

In the above system, the controller is further configured to shorten the turn-on time as the speed data value becomes greater.

Another aspect is an electric transportation system, comprising a rechargeable battery having positive and negative poles; a motor configured to generate a regeneration charge current, and a motor driver including a plurality of transistors and connected to the motor and the battery, wherein the motor driver is configured to i) discharge the battery during a supply period so as to drive the motor and ii) charge the battery with the regeneration charge current during a non-driving period. The system also comprises a controller configured to i) turn on the transistors during the non-driving period so as to store the regeneration charge current in the motor and ii) turn off the transistors during the supply period so as to charge the battery with the regeneration charge current. The system further comprises a speed sensor connected to the motor and controller, wherein the speed sensor is configured to i) sense a speed of the motor and ii) supply speed data to the controller, wherein the controller is further configured to set the supply period and the non-driving period based at least in part on the speed data.

In the above system, the controller is further configured to periodically turn on and off the transistors during the non-driving period.

In the above system, the motor driver further includes a plurality of regeneration diodes each respectively electrically connected in parallel to the transistors.

In the above system, pairs of the transistors are electrically connected in series to each other and in parallel to the battery, wherein the coil comprises three phase coils electrically connected to the transistors, wherein a first terminal of each of the three phase coils is electrically connected to one another, and wherein a second terminal of each of the three phase coils is electrically connected to a node between each pair of transistors.

In the above system, the transistors comprise first to sixth transistors, wherein the controller is further configured to i) turn-on the second, fourth, and sixth transistors during each non-driving period, ii) store a regeneration charge current in the three phase coils, iii) turn-off the second, fourth, and sixth transistors, and iv) charge the battery with the regeneration charge current stored in the three phase coils.

In the above system, the regeneration charge current stored in the three coils is configured to be transmitted to the positive pole through a plurality of regeneration coils each respectively electrically connected in parallel to the first, third, and fifth transistors.

In the above system, the controller is further configured to shorten the turn-on time as the speed data value becomes greater.

According to at least one of the disclosed embodiments, an electric transfer system can improve the battery charge efficiency by automatically performing an energy regeneration operation during a non-driving period of the electric transfer system.

DETAILED DESCRIPTION OF CERTAIN INVENTIVE EMBODIMENTS

Figure 1:
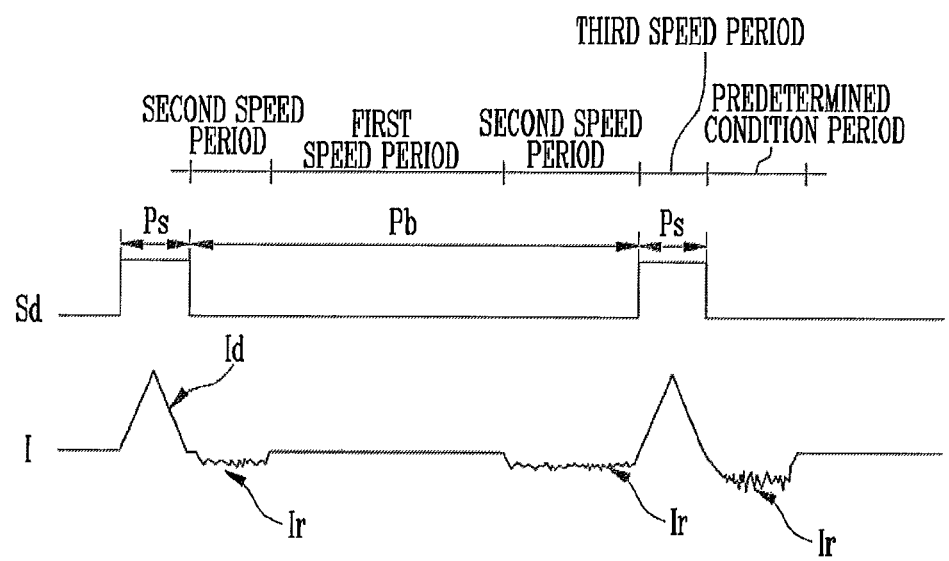
FIG. 1 is a view of an energy regenerating operation that is used in a typical electric transfer system.

FIG. 1 illustrates the operation of energy regeneration used in a typical electric transfer system. When the system moves at a third speed or high speed, the motor is driven as a motor driving current Id is supplied to the motor according to a motor driving signal Sd. Furthermore, when a predetermined condition is satisfied (e.g., when brakes are applied, the electric transfer system moves along a downhill or the system moves at a slower speed), an energy regeneration operation is performed because a motor driving signal Sd is no longer being supplied, thus generating a regeneration charge current Ir for charging the battery.

In this example, distinct speed ranges are defined and the second speed is faster than a first speed, and the third speed is faster than the second speed.

However, in the typical electric transfer system, energy regeneration occurs only when the brakes are applied or on a downhill, without performing a regeneration charging operation when the system is moving at the first speed or generating only a small amount of regeneration charge current when moving at the second speed.

Hereinafter, embodiments will be described in greater detail with reference to the accompanying drawings.

Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but can include deviations in shapes that result, for example, from manufacturing. In the drawings, lengths and sizes of layers and regions can be exaggerated for clarity. Like reference numerals in the drawings denote like elements.

Terms such as 'first' and 'second' can be used to describe various components, but they should not limit the various components. Those terms are only used for the purpose of differentiating a component from other components. For example, a first component can be referred to as a second component, and a second component can be referred to as a first component and so forth without departing from the spirit and scope of the described technology. Furthermore, 'and/or' can include any one of or a combination of the components mentioned.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Furthermore, a singular form can include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Example embodiments will now be described more fully hereinafter with reference to the accompanying drawings; however, they can be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions can be exaggerated for clarity of illustration. It will be understood that when an element is referred to as being "between" two elements, it can be the only element between the two elements, or one or more intervening elements can also be present. Like reference numerals refer to like elements throughout. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
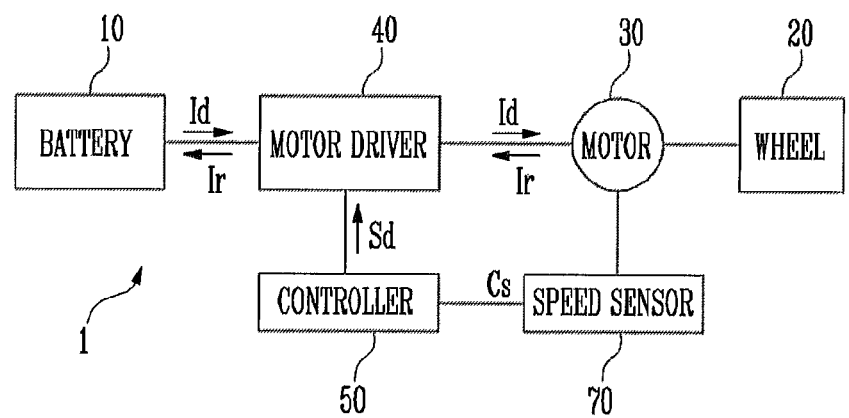
FIG. 2 is a view of an electric transfer system according to an embodiment.
Figure 3:
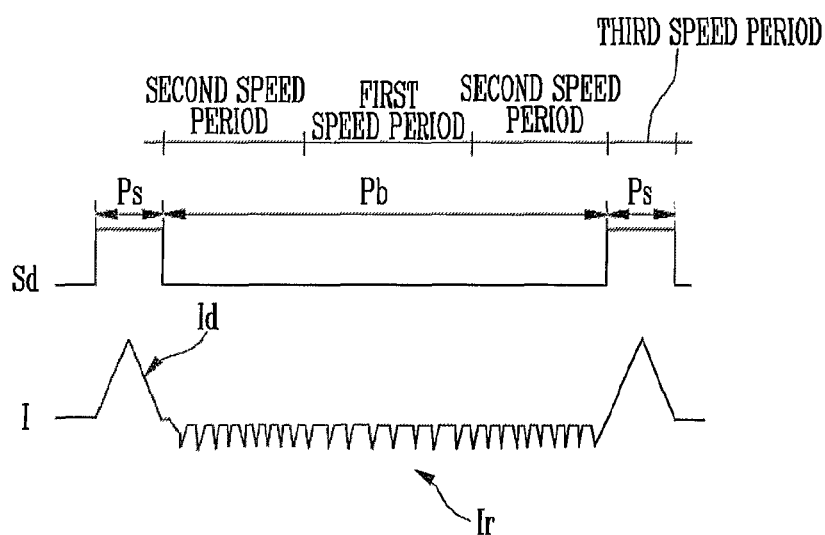
FIG. 3 is a view of an energy regenerating operation according to an embodiment.

FIG. 2 is a view of an electric transfer system according to an embodiment. FIG. 3 is a view of an energy regenerating operation according to an embodiment. Depending on the embodiment, certain elements can be removed from or additional elements can be added to the system illustrated in FIG. 2. Furthermore, two or more elements can be combined into a single element, or a single element can be realized as multiple elements. Each of the elements of FIG. 2 can be implemented as a hardware and/or a software module. This applies to the embodiment of FIG. 4.

FIG. 3 illustrates a motor driving signal Sd for driving or running or operating a motor 30, and a battery current I that includes a motor driving current Id and a regeneration charge current Ir. In some embodiments, the battery current I is output from (+) pole of the battery 10. Furthermore, a second speed is faster than the first speed, and a third speed is faster than the second speed.

Referring to FIG. 2, an electric transportation system 1 includes a battery 10, wheel 20, motor 30, motor driver 40, controller 50, and speed sensor 70.

The electric transportation system 1 can be an electric bicycle, electric motorbicycle, or automobile and the like, but it can be any transportation system that uses electricity as its power source.

The battery 10 can be a secondary battery configured to be discharged to drive the motor 30 or to be charged with regenerated energy generated from the motor 30.

For example, the battery 10 is a nickel-cadmium battery, nickel metal hydride battery, or lithium ion battery. Otherwise, the battery 10 can be a chargeable/dischargeable secondary battery having another configuration.

The wheel 20 enables movement of the electric transportation system 1 as it rotates. In the case of an electric bicycle or electric motorbicycle, generally 2 wheels are installed, whereas in the case of an automobile, generally 4 wheels are installed. However, the number of wheels can vary depending on the type of the electric transportation system 1.

The wheel 20 can be mechanically connected to the motor 30, receive a driving force of the motor 30, and thereby rotate. It can also deliver its rotating force to the motor 30 so that regeneration energy is generated from the motor 30.

The motor 30 is a type of motor that can also be used for power generation. It can be driven by a driving current Id transmitted from the battery 10 through the motor driver 40, or it can generate regeneration energy from rotation of the wheel 20.

Regeneration charge current Ir generated through the power generating function of the motor can be delivered to the battery 10 through the motor driver 40.

Furthermore, a Brushless Direction Current (BLDC) motor can be used as the motor 30.

The motor driver 40 can be connected to the motor 30 and battery 10. Furthermore, the motor driver 40 can control a driving operation or power generating operation (energy regeneration operation) of the motor 30 based at least in part on a signal being supplied from the controller 50.

When a motor driving signal Sd is supplied from the controller 50, the motor driver 40 can drive the motor 30 by discharging the battery 10 based at least in part on the motor driving signal Sd.

In some embodiments, the motor driver 40 delivers the motor driving current Id from the battery 10 to the motor 30 based at least in part on the motor driving signal Sd.

Furthermore, the motor driver 40 can charge the battery 10 by delivering the regeneration energy generated through the power generation operation of the motor 30 to the battery 10 during a non-driving period that exists between periodically supplied motor driving signals Sd.

In some embodiments, the motor driver 40 delivers the regeneration charge current Ir generated from the motor 30 for the non-driving period Pb to the battery 10.

Referring to FIG. 3, a motor driving signal Sd is supplied during a supply period Ps, and a non-driving period Pb occurs between two supply periods Ps.

For example, supply period Ps and non-driving periods Pb alternately occur.

The controller 50 controls the motor driver 40. It can supply a motor driving signal Sd to the motor driver 40 during each supply period Ps so that the motor is driven.

Based at least in part on the electric transportation system 1 reaching the third speed on typical flat ground, the motor driving signal Sd can be supplied to the motor driver 40 based at least in part on a certain frequency (for example, at a certain cycle) in order to maintain a certain number of rotations of the motor 30.

In some embodiments, the electric transportation system 1 has a speed sensor 70 configured to sense a speed of the motor 30, so as to supply speed data Cs of the motor 30 to the controller 50.

Therefore, the controller 50 can set the supply period Ps of the motor driving signal Sd based at least in part on the speed data Cs being supplied from the speed sensor 70, and adjust the speed of the electric transportation system 1 accordingly.

As a motor driving signal Sd is supplied intermittently, there can exist a non-driving period Pb where the motor 30 is not driven, and during the non-driving period Pb, the controller 50 can control the motor driver 40 such that the battery 10 is charged.

In some embodiments, a size of a regeneration charge current that is generated to charge the battery in the motor driver 40 differs depending on a speed of the motor 30. The slower the speed of the motor, the less the current being charged is in the battery 10. Therefore, in typical methods, the motor driver 40 is controlled such that the battery 10 can be charged during the non-driving period Pb only when the motor 30 is driven at or above a certain speed (for example, the second speed).

However, according to typical methods, at a low speed, it is not possible to charge the battery with the regeneration charge current that is generated in the motor, and the battery is charged only when the motor 30 is driven at or above a certain speed, thereby limiting the current amount being charged in the battery.

Therefore, the controller 50 can control on/off of a plurality of transistors, included in the motor driver 40, electrically connected to a negative pole of the battery of a plurality of transistors, and store a regeneration charge current of or above a certain size in coils included in the motor and then supply the current to the battery, thereby increasing the charging efficiency of the battery.

That is, the controller 50 controls the motor driver 40 so that the battery 10 is charged at all speeds during a non-driving period Pb.

Figure 4:
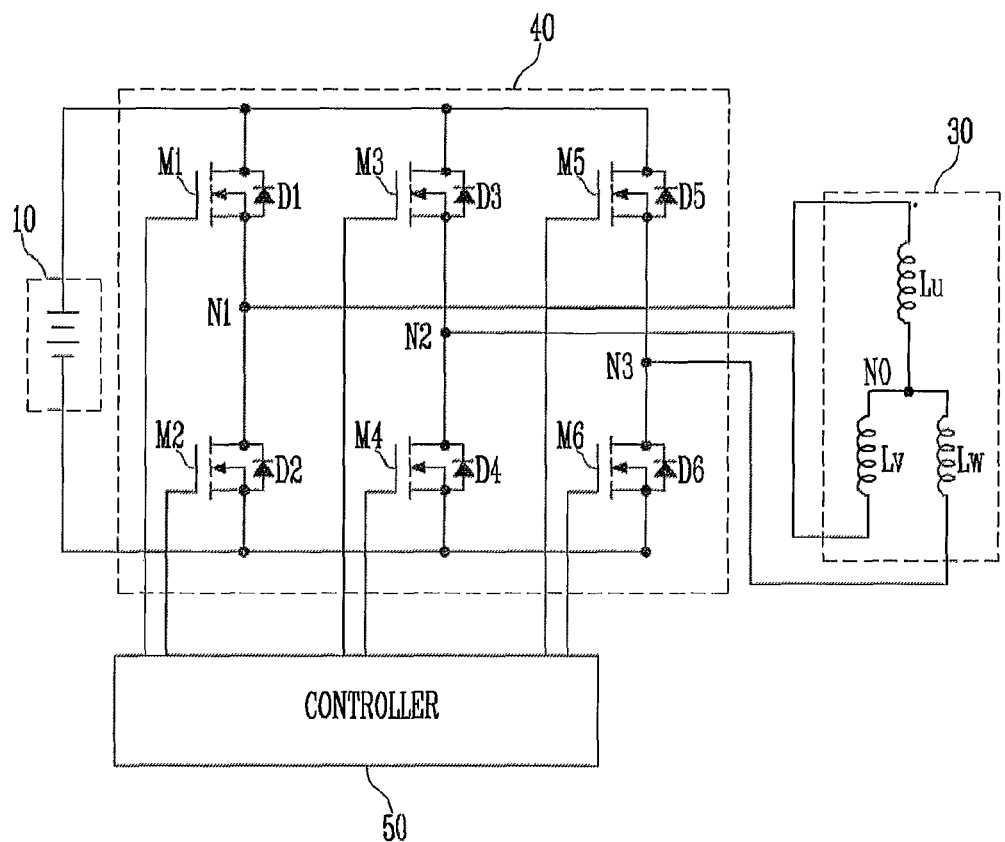
FIG. 4 is a view of configuration of a motor driver according to an embodiment.

FIG. 4 is a view specifically illustrating a configuration of a motor driver according to an embodiment.

Referring to FIG. 4, the motor driver 40 includes a plurality of transistors M1-M6, and regeneration diodes D1-D6, respectively electrically connected in parallel to each of the transistors M1-M6.

Herein, two transistors are connected in series to each other, thereby forming a pair of transistors.

These pairs of transistors can be connected in parallel to the battery 10.

For example, first and second transistors M1 and M2 are connected in series to each other and connected in parallel to the battery 10, third and fourth transistors M3 and M4 connected in series to each other and connected in parallel to the battery 10, and fifth and sixth transistors M5 and M6 connected in series to each other and connected in parallel to the battery 10.

A first electrode of an odd number$^{th}$ transistor M1, M3, and M5 of the pairs of transistors can be connected to a (+) pole of the battery 10, and a second electrode of an even number$^{th}$ transistor M2, M4, and M6 of the pairs of transistors can be connected to a (−) pole of the battery 10.

For example, the first electrodes (for example, drain electrodes) of the first transistor M1, third transistor M3, and fifth transistor M5 can all be connected to the (+) pole of the battery 10, and the second electrodes (for example, source electrodes) of the second transistor M2, fourth transistor M4, and sixth transistor M6 can all be connected to an (−) pole of the battery 10.

Furthermore, the second electrode of an odd number$^{th}$ transistor M1, M3, and M5 of the pairs of transistors can be connected to the first electrode of the even number$^{th}$ transistors M2, M4, and M6 of the pairs of transistors.

For example, the second electrode of the first transistor M1 is connected to the first electrode of the second transistor M2, the second electrode of the third transistor M3 is connected to the first electrode of the fourth transistor M4, and the second electrode of the fifth transistor M5 is connected to the first electrode of the sixth transistor M6.

In some embodiments, terminals of coils Lu, Lv, and Lw on three phases included in the motor 30 are all connected to one node N0.

Furthermore, another terminal of a u-phase coil Lu can be connected to a common node N1 between the first and second transistors M1 and M2. A v-phase coil Lv can be connected to a common node N2 between the third and fourth transistors M3 and M4. A w-phase coil Lw can be connected to a common node N3 between the fifth and sixth transistors M5 and M6.

Regeneration diodes D1-D6 are connected in parallel to each transistor M1-M6, enabling current to flow from the second electrode to first electrode of each transistor M1-M6.

Figure 5:
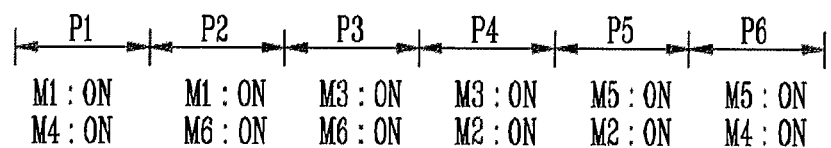
FIG. 5 is a view of an operation of a motor driver being controlled according to a motor driving signal.

FIG. 5 is a view illustrating an operation of a motor driver being controlled according to a motor driving signal. FIG. 5 illustrates an on-off state of each transistor being controlled according to a motor driving signal Sd transmitted from the controller 50.

Referring to FIG. 5, during a first period P1, by the motor driving signal Sd being supplied from the controller 50, the first transistor M1 and fourth transistor M4 are turned on, and the rest are turned off. Therefore, the motor driving current Id flows along a path from the (+) pole to the (−) pole of the battery 10 through the first transistor M1, the u-phase coil Lu, the v-phase coil Lv, and the fourth transistor M4.

During the second period P2, the first transistor M1 and the sixth transistor M6 are turned on by the motor driving signal Sd supplied from the controller 50, and the rest of the transistors are turned off. Therefore, the motor driving current Id flows along a path from the (+) pole to the (−) pole of the battery 10 through the first transistor M1, the u-phase coil Lu, the w-phase coil Lw, and the sixth transistor M6.

During the third period P3, the third transistor M3 and the sixth transistor M6 are turned on by the motor driving signal Sd supplied from the controller 50, and the rest of the transistors are turned off. Therefore, the motor driving current Id flows along a path from the (+) pole to the (−) pole of the battery 10 through the third transistor M3, the v-phase coil Lv, the w-phase coil Lw, and the sixth transistor M6.

During the fourth period P4, the third transistor M3 and the second transistor M2 are turned on by the motor driving signal Sd supplied from the controller 50, and the rest of the transistors are turned off. Therefore, the motor driving current Id flows along a path from the (+) pole to the (−) pole of the battery 10 through the third transistor M3, the v-phase coil Lv, the u-phase coil Lu, and the second transistor M2.

During the fifth period P5, the fifth transistor M5 and the second transistor M2 are turned on by the motor driving signal Sd supplied from the controller 50, and the rest of the transistors are turned off. Therefore, the motor driving current Id flows along a path from the (+) pole to the (−) pole of the battery 10 through the fifth transistor M5, the w-phase coil Lw, the u-phase coil Lu, and the second transistor M2.

During the sixth period P6, the fifth transistor M5 and the fourth transistor M4 are turned on by the motor driving signal Sd supplied from the controller 50, and the rest of the transistors are turned off. Therefore, the motor driving current Id flows along a path from the (+) pole to the (−) pole of the battery 10 through the fifth transistor M5, w-phase coil Lw, v-phase coil Lv, and the fourth transistor M4.

That is, the controller 50 can control the motor driver 40 as aforementioned during the period where the motor driving signal Sd is supplied by supplying the motor driving signal Sd, and can perform the driving operation of the motor 30 for rotating the wheel 20 accordingly.

Furthermore, the controller 50 can control the motor driver 30 such that the motor 30 performs a power generating operation during the non-driving period Pb.

That is, the controller 50 can control the motor driver 40 such that the battery is charged during the non-driving period Pb besides when the motor 30 is driven to the third speed section based at least in part on the speed data Cs supplied from the speed sensor 70.

Specifically, the controller 50 forms a closed circuit between the motor driver 40 and motor 30 by a turn-on control of the second, fourth, and sixth transistor M2, M4, and M6 connected to a negative pole of the battery 10 during the non-driving period Pb. Accordingly, a regeneration charge current Ir is stored in the three phase coils Lu, Lv, Lw.

When a certain time is passed after the turn-on control of the second, fourth and sixth transistors M2, M4, M6, the controller 50 turn-off controls the second, fourth, and sixth transistors M2, M4, and M6, such that the regeneration charge current Ir stored in the three phase coils Lu, Lv, and Lw are charged in the battery 10.

Herein, the regeneration charge current Ir stored in the three phase coils can be transmitted to the (+) pole of the battery via the regeneration diodes D1, D3, and D5 connected in parallel to the first, third, and fifth transistors M1, M3, and M5.

In some embodiments, the controller 50 can repeatedly turn on/off of the second, fourth, and sixth transistors M2, M4, and M6 during the non-driving period Pb. In some embodiments, the controller 50 controls the turn-on time of the second, fourth, and sixth transistors M2, M4, and M6 so that an inductor current of the three coils Lu, Lv, and Lw increases sufficiently, and control the turn-off time of the second, fourth, and sixth transistors M2, M4, and M6 so that the regeneration charge current stored in the three phase coils Lu, Lv, and Lw are all transmitted to the battery 10.

In some embodiments, the controller 50 controls the turn-on times of the second, fourth, and sixth transistors M2, M4, and M6 differently based at least in part on the speed data Cs supplied from the speed sensor 70. In some embodiments, as the speed gets faster, the turn-on time of the second, fourth, and sixth transistors is controlled to be shorter.

For example, the controller 50 controls the turn-on time of the second, fourth, and sixth transistors M2, M4, and M6 at the first speed to be longer than the turn-on control time of the second, fourth, and sixth transistors M2, M4, and M6 at the second speed. This occurs because the second speed is faster than the first speed. When the second, fourth, and sixth transistors M2, M4, and M6 are turned-on, the regeneration charge current Ir stored in the three phase coils Lu, Lv, and Lw is less than when stored at the first speed. That is, referring to FIG. 3, the regeneration charge current Ir generated at the second speed is generated by a shorter cycle than the regeneration charge current Ir generated at the first speed.

According to embodiments of the described technology, regeneration charge current Ir is supplied during the non-driving period, thereby improving the charge efficiency of the battery. Furthermore, regardless of the speed of the electric transportation system, the regeneration charge current Ir is stored in the three phase coils through on/off control of the transistors included in the motor driver during the non-driving period, and then supplied to the battery, thereby improving the charge efficiency of the battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment can be used singly or in combination with features, characteristics, and/or elements described in connection with other embodiments unless otherwise specifically indicated. Accordingly, it will be understood by those of skill in the art that various changes in form and details can be made without departing from the spirit and scope of the present invention as set forth in the following claims.

The invention claimed is:

1. An electric transportation system comprising:
   a wheel;
   a rechargeable battery having positive and negative poles;
   a motor mechanically connected to the wheel and configured to generate a regeneration charge current, wherein the motor comprises a coil;
   a motor driver connected to the motor and the battery and configured to i) discharge the battery during a supply period so as to drive the motor and ii) receive the regeneration charge current from the motor and convey the received regeneration charge current to the battery during a non-driving period, wherein the motor driver includes a plurality of transistors electrically connected to the negative pole; and
   a controller connected to the motor driver and configured to i) control the motor driver so as to drive the motor during the supply period and ii) control the motor driver so as to charge the battery during the non-driving period,
   wherein the controller is further configured to i) turn on the transistors connected to the negative pole during the non-driving, period so as to store the regeneration charge current in the coil and ii) turn off the transistors connected to the negative pole so as to charge the battery with the regeneration charge current,
   wherein the motor driver is configured to receive a discharge current from the battery prior to the motor receiving the discharge current during the supply period, and wherein the motor driver is positioned between the battery and the motor,
   wherein the coil comprises three phase coils electrically connected to the transistors, wherein the transistors comprise first to sixth transistors, and wherein the controller is further configured to i) turn-on the second, fourth, and sixth transistors during the non-driving period, ii) store a regeneration charge current in the three phase coils, iii) turn-off the second, fourth, and sixth transistors, and iv) charge the battery with the regeneration charge current stored in the three phase coils.

2. The system according to claim 1, wherein the controller is further configured to periodically turn on and off the transistors during the non-driving period.

3. The system according to claim 2, further comprising a speed sensor connected to the motor and controller and configured to i) sense a speed of the motor and ii) supply speed data to the controller, wherein the controller is further configured to set the supply period and the non-driving period based at least in part on the speed data.

4. The system according to claim 3, wherein the controller is further configured to change a turn-on time of the transistors electrically connected to the negative pole during the non-driving period based at least in part on the speed data.

5. The system according to claim 4, wherein the controller is further configured to shorten the turn-on time as the speed data value becomes greater.

6. The system according to claim 1, wherein the motor driver further includes a plurality of regeneration diodes each respectively electrically connected in parallel to the transistors.

7. The system according to claim 6, wherein pairs of the transistors are electrically connected in series to each other and in parallel to the battery.

8. The system according to claim 7, wherein each transistor includes first and second electrodes, wherein the first electrode of an odd number$^{th}$ transistor of the pairs of transistors is electrically connected to the positive pole, and wherein the second electrode of an even number$^{th}$ transistor of the pairs of transistors is connected to the negative pole.

9. The system according to claim 8, wherein the second electrode of the odd number$^{th}$ transistor of the pairs of transistors is electrically connected to the first electrode of the even number$^{th}$ transistor of the pairs of transistors.

10. The system according to claim 8, wherein a first terminal of each of the three phase coils is electrically connected to one another, and wherein a second terminal of each of the three phase coils is electrically connected to a node between each pair of transistors.

11. The system according to claim 1, wherein the regeneration charge current stored in the three coils is configured to be transmitted to the positive pole through a plurality of regeneration coils each respectively electrically connected in parallel to the first, third, and fifth transistors.

12. The system according to claim 1, wherein the battery is configured to provide a driving current, and wherein the motor driver is configured to receive the driving current and provide the received driving current to the motor.

13. An electric transportation system, comprising:

a rechargeable battery having positive and negative poles;

a motor configured to generate a regeneration charge current, wherein the motor comprises a coil;

a motor driver including a plurality of transistors and connected to the motor and the battery, wherein the transistors are electrically connected to the negative pole, and wherein the motor driver is configured to i) discharge the battery during a supply period so as to drive the motor and ii) receive the regeneration charge current from the motor and convey the received regeneration charge current to the battery during a non-driving period;

a controller configured to turn on the transistors connected to the negative pole so as to store the regeneration charge current in the motor and to turn off the transistors connected to the negative pole so as to charge the battery with the regeneration charge current during the non-driving period; and a speed sensor connected to the motor and controller, wherein the speed sensor is configured to i) sense a speed of the motor and ii) supply speed data to the controller, wherein the controller is further configured to set the supply period and the non-driving period based at least in part on the speed data, wherein the motor driver is configured to receive a discharge current from the battery prior to the motor receiving the discharge current during the supply period, and wherein the motor driver is positioned between the battery and the motor, wherein the coil comprises three phase coils electrically connected to the transistors, wherein the transistors comprise first to sixth transistors, and wherein the controller is further configured to i) turn-on the second, fourth, and sixth transistors during the non-driving, period, ii) store a regeneration charge current in the three phase coils, iii) turn-off the second, fourth, and sixth transistors, and iv) charge the battery with the regeneration charge current stored in the three phase coils.

14. The system according to claim 13, wherein the controller is further configured to periodically turn on and off the transistors during the non-driving period.

15. The system according to claim 13, wherein the motor driver further includes a plurality of regeneration diodes each respectively electrically connected in parallel to the transistors.

16. The system according to claim 15, wherein pairs of the transistors are electrically connected in series to each other and in parallel to the battery, wherein a first terminal of each of the three phase coils is electrically connected to one another, and wherein a second terminal of each of the three phase coils is electrically connected to a node between each pair of transistors.

17. The system according to claim 16, wherein the regeneration charge current stored in the three coils is configured to be transmitted to the positive pole through a plurality of regeneration coils each respectively electrically connected in parallel to the first, third, and fifth transistors.

18. The system according to claim 13, wherein the controller is further configured to shorten the turn-on time as the speed data value increases.

* * * * *